United States Patent Office 3,048,586
Patented Aug. 7, 1962

3,048,586
NOVEL DERIVATIVES OF PHENOXAZINE AND PROCESSES FOR THEIR PREPARATION
André Girard, Paris, France, assignor, by mesne assignments, to Roussel-UCLAF, S.A., Paris, France, a corporation of France
No Drawing. Filed Mar. 16, 1960, Ser. No. 15,266
15 Claims. (Cl. 260—244)

This invention relates to certain 7-di-substituted amino-3-monoalkylamino-N-alkyl-phenoxazime-2 derivatives and their non-toxic acid addition salts and to processes for the production of these phenoxazime derivatives. These derivatives have an anti-tubercular activity.

It is known that certain derivatives of phenoxazine exhibit an anti-tubercular activity [Crossley et al., J. Am. Chem. Soc. 74, 573–8 (1952), and Clapp et al., J. Am. Chem. Soc. 74, 1989–93, 1994–96 (1952)].

However, it has heretofore not been possible to make profitable use of this activity in therapy because of the strong dyeing properties of these derivatives. Thus, experience has shown that they dye the tissues and epidermis of animals to such a lasting degree that the animals remained dyed for several years.

An object of the present invention is the obtention of novel derivatives of phenoxazine, namely, 7-di-substituted amino-3-monoalklamino-N-alkyl-phenoxazime-2 deriavtives of the general structural formula:

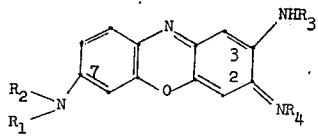

and their non-toxic acid addition salts wherein $R_1$, $R_2$ $R_3$ and $R_4$ are straight or branched chain alkyl radicals containing 2 to 4 carbon atoms. $R_1$ and $R_2$ may also be joined to form a piperidyl or pyrrolidyl ring which may carry further alkyl substituents. The total number of carbon atoms in $R_1$, $R_2$ $R_3$ and $R_4$ is preferably between 11 and 13 carbon atoms.

Another object of this invention is the development of processes for the production of 7-di-substituted amino-3-monoalkylamino-N-alkyl-phenoxazime-2 derivatives and their non-toxic acid addition salts.

A still further object of this invention is the development of 7-di-substituted amino-3-monoalkylamino-N-alkyl-phenoxazime-2 derivations and their non-toxic acid addition salts useful in tubercular therapy.

A further object of this invention is the development of useful anti-tubercular agents free of unwanted side effects such as dyeing of the skin and high toxicity.

These and other objects of this invention will become more apparent as this description proceeds.

I have found that 7-di-substituted amino-3-monoalkyl-amino-N-alkyl-phenoxazime-2 derivatives of the general structural formula:

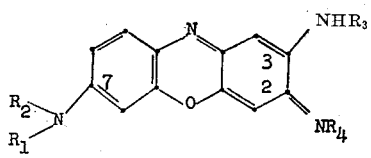

(VII)

and their non-toxic acid addition salts wherein $R_1$ and $R_2$ are radicals selected from the group consisting of alkyl radicals having from 2 to 4 carbon atoms, and, when taken together, pentamethylene and tetramethylene radicals, said pentamethylene and tetramethylene radicals having alkyl substituents attached thereto containing from 0 to 4 carbon atoms, and $R_3$ and $R_4$ are radicals selected from the group consisting of alkyl radicals having from 2 to 4 carbon atoms, with the proviso that the total number of carbon atoms contained in $R_1$, $R_2$, $R_3$ and $R_4$ is between 11 and 13, are novel and useful industrial products.

These novel compounds are endowed with a considerable anti-tubercular activity which is superior to that of the dyes studied by the American authors cited above, while being free from a lasting dyeing effect on the skin of animals or humans in therapeutic doses.

Thus, 7-dipropylamino-3-butylamino-N-propyl-phenoxazime-2 (VII wherein $R_1=R_2=$propyl, $R_3=$butyl, $R_4=$propyl and $R_1+R_2+R_3+R_4=13$ carbon atoms), administered perorally, produces a preventive effect against tubercular activity in mice and a curative effect against tubercular activity in guinea pigs, which effects are entirely comparable to the activity of isonicotinic hydrazide in tuberculosis therapy, but at 3 to 5 times higher doses, so that the compound provides for good tolerance and absence of all cumulative effects.

The following example illustrates the anti-tubercular activity of the above-mentioned compound in a curative test on guinea pigs.

36 guinea pigs each received 1 mgm. of bacillus $H_{37}Rv$ by subcutaneous injection in the inguinal region.

After twenty days, four of the animals were sacrificed to determine the development of their lesions.

In all of the sacrificed animals it was found that the inguinal and mediastinal ganglia had been strongly attacked and in one animal the liver had been attacked slightly, but all of the spleens had lesions. The point of inoculation, the lungs and the kidneys were not yet affected.

The remaining 32 animals were divided into two groups: 16 controls and 16 animals which were treated perorally by means of a tube with a single daily dose of 25 mgm./kg. of 7-dipropylamino-3-butylamino-N-propyl-phenoxazime-2 from the 21st to the 120th day, that is, for 100 days.

Seven control animals died between the 32nd and the 116th day from very strong lesions of general tuberculosis.

The nine surviving control animals were sacrificed at the end of the experiment and were found to contain richly bacillified lesions almost as intense and generalized as in the animals which had succumbed. The kidneys in all cases remained intact.

The 16 treated guinea pigs were all alive at the end of the experiment. After macroscopic and microscopic examination of their organs it was found that 10 of the animals showed no trace of any lesion or bacilli.

All of the viscera and the mediastinal ganglia of the 16 animals were sterile, except that in 6 of them very minor ganglionic lesions (inguinal ganglia occurred) in which the process of healing continued.

The most active compounds are those in which $R_1$, $R_2$, $R_3$ and $R_4$ contain a total of 11, 12 or 13 carbon atoms. The distribution of these carbon atoms among the various radicals has only little effect upon the therapeutic activity of the compound and merely modifies the toxicity of the product.

The fact that there is no cross-resistance developed between the phenoxazimes of this type and the known principal remedies against tuberculosis constitutes an advantage of the very highest importance.

These tetra-substituted diamino-phenoxazimes are, in the form of free bases, red crystalline substances with slightly elevated melting points and are highly fat-soluble but very slightly soluble in water.

All of the usual organic solvents dissolve them. Petroleum ether and 80% acetone in water are very suitable for their crystallization.

They are weak bases and with acids yield monosalts which are generally soluble in water, the solutions being clear blue. The solutions change color in the neighborhood of neutrality and this turning point varies slightly with the total number of alkyl carbon atoms. Thus, in sub-toxic doses, the compound with 11 alkyl carbon atoms temporarily dyes the animals blue and the compound with 13 alkyl carbon atoms dyes them pink. In contrast to the naphthalenic phenoxazimes studied by Crossley the compounds of the invention are destroyed in the animal organism after a few hours or a few days, depending upon the dose.

The acid addition salts are made in the customary manner by dissolving the free base in a solvent and adding an equimolecular amount of a non-toxic acid. The acid addition salt is crystallized from the solvent. Among the suitable acids for use in preparing non-toxic acid addition salts are those generally used in the art, such as citric acid, phosphoric acid and phthalic acid.

The processes for the preparation of the products in accordance with the invention is summarized in the following schematic flow sheets, Tables I and II.

TABLE I

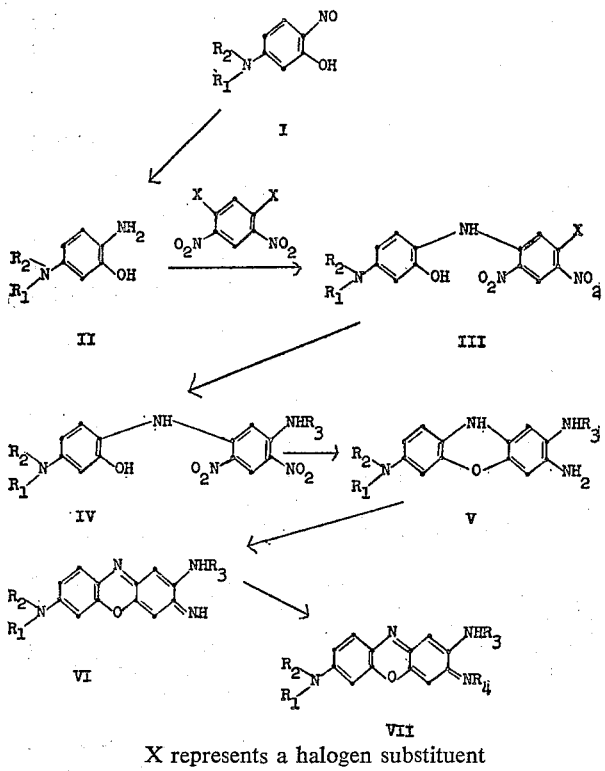

X represents a halogen substituent

Table I depicts a process consisting essentially of catalytically reduced the nitroso group of a 2-nitroso-5-disubstituted amino-phenol of the formula

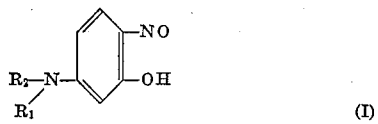

wherein $R_1$ and $R_2$ have the meaning previously mentioned, into the corresponding 2-amino-5-di-substituted amino-phenol (II) by hydrogenating in the presence of a hydogenation catalyst. This compound is then condensed in an inert atmosphere with a stoichiometric amount of a 1,3-dihalo-4,6-dinitro-benzene in the presence of an acid-binding agent, such as a tertiary amine, to obtain a 3-halo-4,6-dinitro-2'-hydroxy-4'-di-substituted amino-diphenylamine (III), which is a well-crystallized black substance yielding pale yellow salts.

By heating compound III with a primary alkyl amine, $R_3$—$NH_2$, at reflux, a replacement of the 3-halo atom by the amino radical $R_3$—NH— takes place, yielding a 3-alkylamino-4,6-dinitro-2'-hydroxy-4'-di-substituted amino-diphenylamine (IV), which is brick red.

By reduction of compound IV, for example, with the aid of zinc powder in acetic acid, at a moderately elevated temperature the two $NO_2$ groups are reduced into amino groups while one molecule of ammonia is simultaneously given off, and a 2-amino-3-alkylamino-7-di-substituted amino-phenoxazine (V) is obtained.

By bubbling air or oxygen through the solution, which has been filtered to separate the zinc acetate and excess zinc, a deep blue acetic acid solution is obtained which contains a 3-alkylamino-7-di-substituted amino-phenoxazime-2 (VI) in the pure state. This compound is isolated by extraction with a water-immiscible solvent, such as ether, after making the acetic solution alkaline. The oxidation can be performed in the presence of a trace of platinum, advantageously.

By allowing compound VI to stand for 24 to 48 hours, preferably in the form of an acid addition salt (hydrochloride, acetate, phthalate, etc.), in the presence of an excess of an alkyl amine, a molecular amount of an acid addition salt of the alkyl amine is produced, a molecule of ammonia is given off and the imino group is replaced by the radical $=N-R_4$. The same aminolysis may be effected by 2 hours of heating at 50 to 60° C. It is also possible to operate differently and treat a salt of phenoxazime with an excess of the primary amine, preferably in an appropriate solvent, such as dioxan.

After filtering off the ammonium salt (admixed with the alkyl amine acid addition salt), the desired dye VII is isolated by distilling off the excess of amine, redissolving the residue in an appropriate solvent, such as dioxan, and precipitating the base in the form of a salt by adding a solution of an appropriate acid in the same solvent.

In those cases where the substituent $R_4$ on the imino nitrogen is a secondary radical, compound VI may also be condensed with a ketone in the presence of phosphoric acid in accordance with the method of Barry et al., J. Chem. Soc. (1956), 888, 3347; (1958) 859, in order to form glyoxalino-phenoxazines, according to the simplified schematic reaction equation:

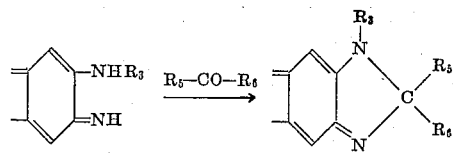

wherein $R_5$ and $R_6$ are methyl or ethyl, and causing the imidazole ring to open by hydrogenation to obtain a phenoxazime-2 of the Formula VII in which $R_4$ is

TABLE II

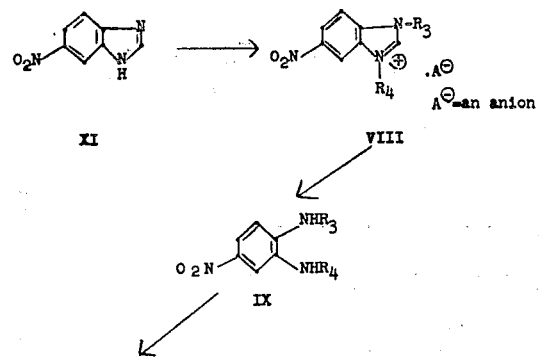

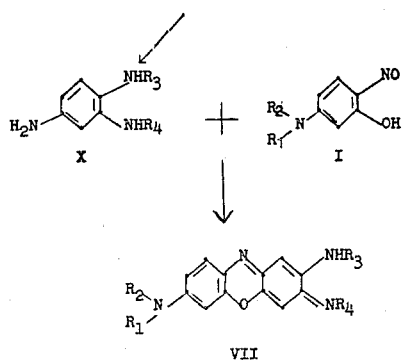

Table II depicts an alternative and better process consisting essentially of transforming the 5-nitrobenzimidazole (XI) into a 5-nitro-N'-alkylbenzimidazole by reaction of an alkyl halide with the sodium or potassium derivative of XI. This reaction is carried out by heating the nitrobenzimidazole with the alkyl halide and an alkali metal carbonate in an inert solvent. The N'-monoalkyl-benzimidazole is then transformed into a quaternary ammonium salt of the formula:

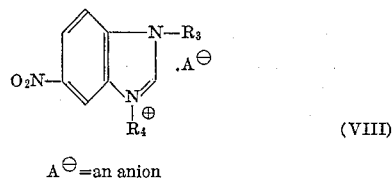

$A^\ominus$ = an anion wherein $R_3$ and $R_4$ have the meanings indicated above, by quaternizing with an alkyl ester of the formula $R_4A$, the 5-membered ring is then opened by means of boiling with a strong alkali, accompanied by the elemination of 1 molecule of formic acid to obtain a 3-nitro-o-phenylene-diamine of the formula:

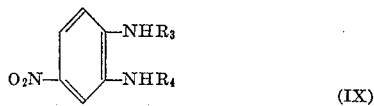

wherein $R_3$ and $R_4$ still have the same meanings as above indicated.

By catalytically reducing the nitro group of the phenylene diamine IX, this compound is transformed into the corresponding triamine (X), which is condensed in homogeneous phase and in an alkaline buffered medium, preferably in pyridine, at room temperature, with a 2-nitroso-5-di-substituted phenol of the formula:

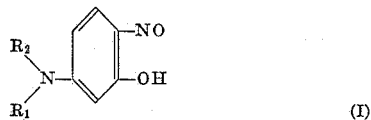

wherein $R_1$ and $R_2$ have the meanings indicated above, to produce the desired 3-monoalkylamino-7-di-substituted amino-N-alkylphenoxyazime-2 (VII).

The following examples are illustrative of the invention. One skilled in the art, however, will readily understand that changes and modifications of these examples can be made.

EXAMPLE I

7-Dipropylamino-3-Butylamino-N-Propyl-Phenoxazime-2

(VII in which $R_1=R_2=R_4=$propyl and $R_3=$butyl)

CONDENSATION

The hydrochloride of 2-nitroso-5-dipropylaminophenol (I in which $R_1=R_2=$propyl) is reduced with platinum oxide and hydrogen in an alcoholic hydrochloric acid solution.

One gram-mol of the dihydrochloride of 2-amino-5-di-propylaminophenol (II in which $R_1=R_2=$propyl) (281 gm.) is dissolved in 2700 cc. of methanol. One gram-mol (240 gm.) of 4,6-dinitro-1,3-dichlorobenzene is added, which is dissolved by heating slightly.

After displacing the air from the flask with $CO_2$, the solution is cooled to 20° C. and then 303 gm. (3 grammols) of triethylamine are added all at once. The reaction commences immediately, accompanied by a lively evolution of heat, followed by the formation of black needles which are separated on a vacuum filter and washed with cold methanol. Their melting point is 188 to 189° C. Yield: 405 gm., which is 94% (Formula III in which X=Cl and $R_1=R_2=$propyl).

These 405 gm. of 3-chloro-4,6-dinitro-2'-hydroxy-4'-dipropylamino-diphenylamine (III) are added to 1000 cc. of butylamine; a lively evolution of heat is produced which raises the liquid to the boiling point. Refluxing is maintained for 2 hours.

The excess amine is distilled off under vacuum, the residue is taken up in 600 cc. of hot methanol and the clear solution is cooled causing a brick red crystalline precipitate to separate. This precipitate has a melting point of 160° C. and is capable of existing in a black form having the same melting point. Yield: 360 gm. (82%) of compound IV where $R_1=R_2=$propyl and $R_3=$butyl.

REDUCTION-CYCLIZATION 100 gm. of this 3-butylamino-4,6-dinitro-2'-hydroxy-4'-diproylamino-diphenyl amine (IV) are dissolved in 600 cc. of acetic acid and reduced by slowly adding 140 gm. of powdered zinc while maintaining the temperature between 20 and 28° C.

When the liquor becomes colorless, the mixture is filtered to separate the zinc acetate and the excess zinc and the filter cake is washed with 250 cc. of acetic acid. The filtrates are combined and the leuco-base is oxidized by bubbling oxygen or air therethrough. The presence of a tarce of platinum is advantageous although not necessary.

When the blue solution no longer absorbs oxygen, which is verified by connecting the flask to a manometric tube, it is precipitated by adding to a mixture consisting of 1600 cc. of 10 N sodium hydroxide, 3 gm. of ice and 200 gm. of infusorial earth. 4 liters of ether are added, the mixture is thoroughly agitated, filtered and the ether is decanted.

After washing the ether solution with water, drying and distilling 74 gm. of pure crystalline phenoxazime-2 are obtained (Formula VI in which $R_1=R_2=$propyl and $R_3=$butyl) which has a melting point of 135–137° C.

AMINOLYSIS

The acid phthalate of this 3-butylamino-7-dipropyl-amino-phenoxazime-2 (VI), prepared in alcohol (deep blue crystals, very slightly soluble in water), is added to 3 parts by volume of absolutely anhydrous propylamine and the entire mixture is either allowed to stand for 48 hours in the cold (20° C.) or refluxed for 3 hours.

The propylamine is distilled off under vacuum and the residue is taken up in dioxan, which dissolves the dye and leaves the ammonium phthalate and the phthalic acid salt of propylamine undissolved.

A portion of the dioxan is distilled off in order to completely eliminate the residual amine which is carried over in the first fraction, and a hot solution of phthalic acid in dioxan is added.

Upon allowing the solution to stand, blue-black felted crystals of the phthalic acid salt separate out which are separated by vacuum filtration and washed on the filter with isopropyl ether.

In order to isolate the base, VII, it is recommended to suspend the dry phthalate in 80% acetone and add aqueous ammonia to the suspension; the 7-dipropylamino-3-butylamino-N-propyl-phenoxazime-2 (VII) base separates out in the form of beautiful red flakes which are washed with water. They may be recrystallized from an 80% acetone, in water solution, if desired. Melting point 78 to 79° C. (Formula VII in which $R_1=R_2=$propyl, $R_3=$butyl, $R_4=$propyl, and $R_1+R_2+R_3+R_4=13$ carbon atoms). This product is not described in the literature.

The monobasic citrate of this compound is a readily water-soluble salt suitable for therapeutic use. It is obtained by adding to the acetone solution of the base, an equimolar solution of citric acid in a small amount of lukewarm acetone.

EXAMPLE II

*7-Dipropylamino-3-Butylamino-N-Ethyl-Phenoxazime-2*
(VII in which $R_1=R_2=$propyl, $R_3=$butyl and $R_4=$ethyl)

This compound was obtained by substituting monoethylamine for the propylamine in the final aminolysis stage of the preceding example.

Brick red needles of 7-dipropylamino-3-butylamino-N-ethyl-phenoxazime-2 (VII) having a melting point of 76° C. are obtained (Formula VII in which $$R_1=R_2=\text{propyl},$$

$R_3=$butyl, $R_4=$ethyl, and $R_1+R_2+R_3+R_4=12$ carbon atoms). The properties of this substance are very similar to those of the substance obtained in the preceding example, with the difference that it is a little more basic. This product is not described in the literature.

EXAMPLE III

*7-Dipropylamino-3-Propylamino-N-Butyl-Phenoxazime-2*
(VII in which $R_1=R_2=$propyl, $R_3=$propyl and $R_4=$butyl)

By condensation of 4,6-(dinitro - 1,3 - dichloro-benzene successively with 2-amino-5-dipropylamino-phenol and then with propylamine under the same conditions described in Example I, the corresponding diphenylamine is obtained. This 3-propylamino-4,6-dinitro-2'-hydroxy-4'-dipropylamino-diphenylamine (IV) is brick red and has a melting point of 161° C. This compound is subjected to a reduction-cyclization and then to reoxidation with air, yielding 7-dipropylamino-3-propylaminophenoxazime-2 (VI) having a melting point of 113° C.

The dinitrobenzoic acid salt of this base (1 part) is introduced into a mixture consisting of 3 parts of dioxan and 0.7 part of anhydrous butylamine. After allowing this mixture to stand for 72 hours at 20° C., the dinitrobenzoic acid salt of butylamine is separated and, after distilling off the solvent, the 7-dipropylamino-3-propylamine-N-butylphenoxazime-2 (VII) base is recrystallized from an 80% acetone in water solution. It has a melting point of 76 to 79° C. (Formula VII in which $$R_1=R_2=R_3=\text{propyl},$$

$R_4=$butyl, and $R_1+R_2+R_3+R_4=13$ carbon atoms). This is the isomer of the compound described in Example I and has similar properties.

This product is not described in the literature.

EXAMPLE IV

*7-Dipropylamino - 3 - Butylamino-N-Isopropyl-Phenoxazime-2* (VII in which $R_1=R_2=$propyl, $R_3=$butyl and $R_4=$isopropyl)

50 gm. of 7-dipropylamino-3-butylamino-phenoxazime-2 (VI), prepared as described in Example I, are dissolved in 1 liter of acetone and 200 cc. of phosphoric acid having a density of 1.7.

After 30 minutes of refluxing, the reaction mixture is precipitated by adding to water which had been made alkaline with an excess of potassium hydroxide. The mixture is then extracted with ether. The extracts are then washed, dried and distilled.

The residue remaing after evaporation of the ether is an oily, currant-red substance with a very strong golden yellow fluorescence. On chromatography, in separation through a column of alumina of a benzene solution, it passes through with the first fraction, behaves like a pure substance, but shows no tendency whatever to crystallize.

The hydrochloride, however, is readily obtained from an alcoholic hydrogen chloride solution by precipitation with isopropyl ether.

It has the formula:

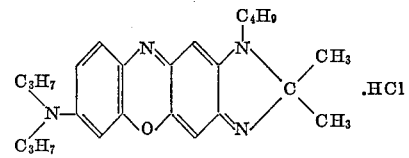

It forms green aqueous solutions which turn blood red by adding an excess of hydrochloric acid.

The base is hydrogenated in alcohol in the presence of platinum oxide and then reoxidized by bubbling air through it. The expected dye is isolated in customary fashion in the form of red needles, which are recrystallized from an 80% acetone in water solution.

The 7-dipropylamino-3-butylamino-N-isopropylphenoxazime-2 base melts at 83 to 84° C. (Formula VII in which $R_1=R_2=$propyl, $R_3=$butyl, $R_4=$isopropyl, and $R_1+R_2+R_3+R_4=13$ carbon atoms). It is not described in the literature.

EXAMPLE V

*7-Diethylamino-3-Butylamino-N-Butylphenoxazime-2*

(VII in which $R_1=R_2=$ethyl, $R_3=$butyl and $R_4=$butyl)

5-nitrobenzimidazole (XI) is butylated by heating it for three hours on a water bath with butyl bromide in methyl-ethyl ketone in the presence of potassium carbonate, yielding a pale yellow substance having a melting point of 78° C. The nitrobutylbenzimidazole, heated for three hours at 130° C. with butyl iodide, yields the crystalline quaternary ammonium iodide of the formula:

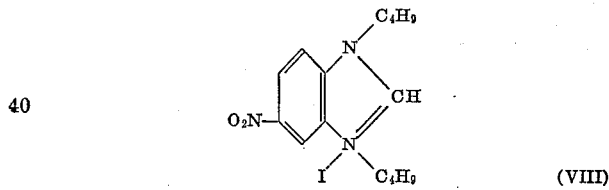

By boiling this compound for one-half hour with a 3 N alcoholic solution of sodium hydroxide, a molecule of formic acid is split off and the 3-nitro-N,N'-dibutyl-o-phenylenediamine (IX) precipitates upon cooling in the form of brick-red crystals having a melting point of 76° C.

By catalytic reduction (platinum and hydrogen) in a medium of alcoholic hydrogen chloride the dihydrochloride of the corresponding triaminobenzene, N,N'-dibutyl-1,2,4-triaminobenzene (X), is obtained in the form of white crystals upon addition of dioxan to the highly concentrated alcoholic solution.

308 gm. (1 mol) of this dihydrochloride of N,N'-dibutyl-1,2,4-triaminobenzene (X) are dissolved in 750 cc. of pyridine. While maintaining this solution below 25° C., a solution of 232 gm. (20% excess of the stoichiometric amount of 2-nitroso-5-diethylaminophenol (I) in 750 cc. of pyridine is introduced dropwise, accompanied by thorough agitation. The solution immediately turns blue and the color intensifies during the subsequent hours.

After allowing the mixture to stand overnight, 1200 cc. of methanol, 2500 cc. of petroleum ether and 200 gm. of infusorial earth are added, accompanied by vigorous mechanical agitation, and then 1000 cc. of 10 N sodium hydroxide and finally 4000 cc. of water are progressively added. After 30 minutes of agitation the mixture is filtered, the filtrate is allowed to separate into two phases and the brick-red petroleum ether phase is separated. The remaining aqueous alcohol phase is again extracted with infusorial earth and petroleum ether. The petroleum ether phases are combined, washed with water, and then with sodium hydroxide and again with water.

After distilling off the petroleum ether, a residue remains behind which weighs 104 gm. and crystalizes partially. The harvested crystals of 7-diethylamino-3-butyl-amino-N-butyl-phenoxazime-2 (VII) are recrystallized from an 80% acetone solution in water, yielding red needles having a melting point of 112° C. (Formula VII in which $R_1=R_2=$ethyl, $R_3=R_4=$butyl, and $$R_1+R_2+R_3+R_4=12 \text{ carbon atoms})$$

The product is not described in the literature.

In this particular case the dye may be advantageously isolated in the form of its acid addition salt with phosphoric acid by stirring an ethereal solution thereof with a solution of monosodium phosphate or phosphoric acid. The acid addition salt with phosphoric acid separates out in the form of green crystals having a reddish-brown hue which are virtually insoluble in water and acetone and slightly soluble in alcohol.

EXAMPLE VI

*7-Piperidino-3-Butylamino-N-Propyl-Phenoxazine-2*

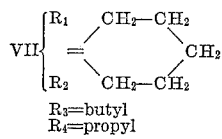

$R_3=$butyl
$R_4=$propyl

N-(3-hydroxyphenyl)-piperidine is transformed into the nitroso derivative in the usual manner and the hydrochloride derivative of the N-(3-hydroxy-4-nitrosophenyl)-piperidine (I) is condensed with the dihydrochloride of 1-butylamino-2-propylamino-4-amino-benzene (X) which is obtained from the corresponding nitrated derivative of the formula:

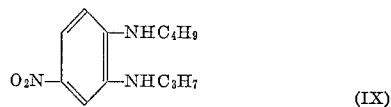

(IX)

having a melting point of 74° C. by reduction with zinc in an alcoholic hydrochloride solution. This nitrated derivative was prepared in the manner described in Example V, except the butyl iodide is replaced with propyl iodide, in order to obtain the corresponding quaternary iodide.

The condensation is carried out in pyridine as previously described. The final extraction with petroleum ether yields a non-crystallizable red oil. This oil, dissolved in benzene, is subjected to chromatographic separation through an alumina column. The desired dye passes through in the first fraction and is obtained in crystalline form by distilling off the benzene. The 7-piperidino-3-butylamino-N-propyl-phenoxazime-2 (VII) is recrystallized from petroleum ether and has a melting point of 76° C. (Formula VII in which $R_2+R_1=$pentamethylene, $R_3=$buyl, $R_4=$propyl, and $$R_1+R_2+R_3+R_4=12 \text{ carbon atoms})$$

It is not described in the literature.

EXAMPLE VII

*7-Dibutylamino-3-Propylamino-N-Ethyl-Phenoxazime-2*

(VII in which $R_1=R_2=$butyl, $R_3=$propyl, $R_4=$ethyl)

The starting materials for the condensation in this case are the hydrochloride of dibutyl-m-aminophenol (pale yellow, well crystallized), which is treated to introduce a nitroso group in the para position to the amino group, and the dihydrochloride of 1-propylamino-2-ethylamino-4-aminobenzene (X), obtained by catalytic reduction of the nitrated derivative having a melting point of 106° C., which in turn is obtained by the same series of steps described in Example V, except that propyl bromide is substituted for butyl bromide and ethyl iodide is substituted for butyl iodide.

The treatment of the condensation product and the chromatographic separation are carried out as previously described, but the lower melting point (around 30° C.) and the extremely high solubility of the phenoxazime makes it difficult to isolate in the form of the free base. The 7-butylamino-3-propylamino-N-ethyl-phenoxazime-2 (VII) is therefore isolated in the form of the phthalic acid addition salt from dioxan. Green crystals having a reddish-brown hue are obtained which are barely soluble in water.

This product is not described in the literature.

The preceding examples are given purely for illustrative purposes and without any intention of limiting the invention. More particularly, it is possible to vary the nature of the solvents and reactants, the temperatures, the reaction periods and the order of introducing the reactants without departing from the scope of the invention. It is understood that these and various other changes and modifications may be made in the invention without departing from the spirit of the invention or scope of the appended claims.

I claim:

1. Phenoxazine-2 derivatives selected from the group consisting of (1) compounds of the formula:

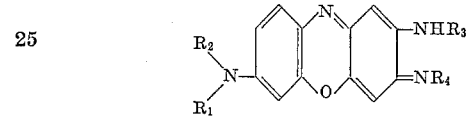

wherein $R_1$ and $R_2$ are selected from the group consisting of alkyl having from 2 to 4 carbon atoms and, when taken together, pentamethylene, alkyl-substituted pentamethylene, tetramethylene and alkyl-substituted tetramethylene, said alkyl substituents having from 1 to 4 carbon atoms, and $R_3$ and $R_4$ are selected from the group consisting of alkyl having from 2 to 4 carbon atoms, with the proviso that the total number of carbon atoms contained in $R_1$, $R_2$, $R_3$ and $R_4$ is between 11 and 13, and (2) non-toxic acid addition salts thereof.

2. A process for the production of phenoxazine-2 derivatives selected from the group consisting of (1) compounds of the formula:

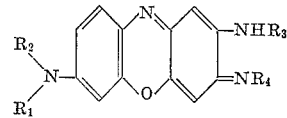

wherein $R_1$ and $R_2$ are selected from the group consisting of alkyl having from 2 to 4 carbon atoms and, when taken together, pentamethylene, alkyl-substituted pentamethylene, tetramethylene and alkyl-substituted tetramethylene, said alkyl substituents having from 1 to 4 carbon atoms, and $R_3$ and $R_4$ are selected from the group consisting of alkyl having from 2 to 4 carbon atoms, with the proviso that the total number of carbon atoms contained in $R_1$, $R_2$, $R_3$ and $R_4$ is between 11 and 13, and (2) non-toxic acid addition salts thereof, which comprises the steps of alkylating 5-nitro-benzimidazole by treatment with an alkyl halide of the formula $R_3X$ wherein $R_3$ has the meaning given above and X represents a halide, quaternizing the 2-alkyl-5-nitrobenzimidazole with an alkyl halide of the formula $R_4X$ wherein $R_4$ has the meaning given above and X represents a halide, boiling the quaternary ammonium salt of 5-nitro-N,N'-dialkyl-benzimidazole of the formula:

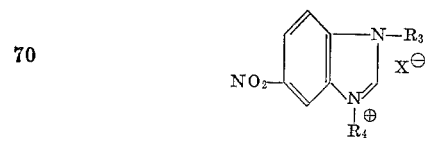

with an alkaline agent to produce the corresponding 3- nitro-o-phenylenediamine, reducing the 3-nitro-o-phenylenediamine of the formula:

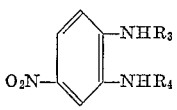

wherein $R_3$ and $R_4$ have the meanings given above by conventional means, condensing the triamine produced with a 2-nitroso-5-di-substituted aminophenol of the formula:

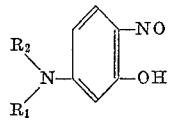

wherein $R_1$ and $R_2$ have the meanings given above in an alkaline buffered medium and isolating said phenoxazime-2 derivatives.

3. 7 - dipropylamino - 3 - butylamino - N - propylphenoxazime-2.

4. 7 - dipropylamino - 3-butylamino-N-ethylphenoxazime-2.

5. 7 - dipropylamino - 3 - propylamino - N - butylphenoxazime.

6. 7 - dipropylamino - 3 - butylamino - N - isopropylphenoxazime-2.

7. 7 - diethylamino - 3 - butylamino - N - butylphenoxazime-2.

8. 7 - piperidyl - 3 - butylamino - N - propylphenoxazime-2.

9. 7 - dibutylamino - 3 - propylamino - N - ethylphenoxazime-2.

10. The monobasic acid addition salt of citric acid and 7-dipropylamino-3-butylamino-N-propyl-phenoxazime-2.

11. The acid addition salt of phosphoric acid and 7-diethylamino-3-butylamino-N-butyl-phenoxazime-2.

12. The acid addition salt of phthalic acid and 7-dibutylamino-3-propylamino-N-ethyl-phenoxazime-2.

13. The process of claim 2 wherein the opening of the ring of the 5-nitro-N,N'-dialkylbenzimidazole quaternary ammonium salts is effected by boiling with an alcoholic solution of a strong alkali.

14. The process of claim 2 wherein the 3-nitro-o-phenylenediamine is reduced by hydrogenation in the presence of an appropriate metal catalyst.

15. The process of claim 2 wherein the condensation with the nitroso-aminophenols in an alkaline buffered medium is carried out in pyridine.

References Cited in the file of this patent
UNITED STATES PATENTS 2,069,670　Hoffmann _____ Feb. 2, 1937

OTHER REFERENCES

Beilstein: Handbuch der Organischen Chemie, Band 27, H.W., pp. 388–9, 409 (1910).